United States Patent [19]

Bonnah, II et al.

[11] Patent Number: 5,405,175
[45] Date of Patent: Apr. 11, 1995

[54] CLIP ATTACHMENT OF FUEL TUBE TO FUEL RAIL

[75] Inventors: Harrie W. Bonnah, II; Ray J. Hernandez, both of Newport News, Va.

[73] Assignee: Siemens Automotive L.P., Auburn Hills, Mich.

[21] Appl. No.: 127,210

[22] Filed: Sep. 24, 1993

[51] Int. Cl.6 ............................................. F16L 37/12
[52] U.S. Cl. .................................. 285/305; 285/319; 285/921; 24/590; 403/319
[58] Field of Search ............... 285/305, 921, 319, 325; 403/319, 371; 24/136 L, 136 R, 590

[56] References Cited

U.S. PATENT DOCUMENTS

| | | | |
|---|---|---|---|
| 3,245,703 | 4/1966 | Manley | 285/319 |
| 3,768,844 | 10/1973 | Goward | 285/305 X |
| 4,059,295 | 11/1977 | Helm | 285/305 |
| 4,244,608 | 1/1981 | Stuemky | 285/305 |
| 4,524,995 | 6/1985 | Bartholomew | 285/305 X |
| 4,561,682 | 12/1985 | Tisserat | 285/319 |
| 4,869,534 | 9/1989 | Ketcham et al. | 285/305 X |
| 5,152,555 | 10/1992 | Szabo | 285/305 X |
| 5,207,462 | 5/1993 | Bartholomew | 285/921 X |
| 5,211,427 | 5/1993 | Washizu | 255/305 X |
| 5,228,724 | 7/1993 | Godeau | 285/921 X |
| 5,269,571 | 12/1993 | Haggard | 285/305 |
| 5,275,443 | 1/1994 | Klinger | 285/305 |

FOREIGN PATENT DOCUMENTS

| | | | |
|---|---|---|---|
| 0302674 | 2/1989 | European Pat. Off. | 285/305 |
| 2360921 | 6/1974 | Germany | 285/305 |

*Primary Examiner*—Randolph A. Reese
*Assistant Examiner*—Heather Chun Shackelford
*Attorney, Agent, or Firm*—George L. Boller; Russel C. Wells

[57] ABSTRACT

A fuel tube is attached to a fuel rail by a novel one-piece plastic clip comprising an integral fork for trapping a flange of the fuel tube against withdrawal from the fuel rail hole in which it is received and also comprising integral catches at the sides for catching on notches in the wall of the fuel tube.

35 Claims, 2 Drawing Sheets

1

CLIP ATTACHMENT OF FUEL TUBE TO FUEL RAIL

FIELD OF THE INVENTION

This invention relates to a joint for joining a fuel tube to a fuel rail by means of a clip.

BACKGROUND AND SUMMARY OF THE INVENTION

With the advent of plastic fuel rails, new designs for attaching appurtenances to a fuel rail must be developed. One such appurtenance is a metal or plastic fuel tube, examples of such tubes in a fuel rail assembly being a fuel supply tube, a fuel return tube, and a fuel crossover tube. Although a number of designs for attaching plastic and metal tubes are known to the applicants, many are poorly suited for plastic fuel rail applications because they are too complex, too weak, too expensive or because their tolerances cannot be adequately controlled. It is believed that need exists for improvements for attachment designs for this application. It is toward fulfilling this need that the present invention is directed.

Accordingly, a primary object of the invention is to provide a functionally integrated attachment clip for attaching a fuel tube to a fuel rail, such clip possessing the attributes of low-cost and ease of attachment, and being capable of creating and reliably maintaining integrity of the joint against leaks, yet allowing the joint to be conveniently disconnected if an occasion requiring its disconnection ever arises. A joint embodying principles of the invention allows full 360 degree relative rotation of a fuel tube while keeping a fuel and pressure resistant seal.

The foregoing features, advantages, and benefits of the invention will be seen in the ensuing description and claims which are accompanied by drawings that disclose a presently preferred embodiment of the invention according to the best mode contemplated at this time for carrying out the invention.

DESCRIPTION OF THE PREFERRED EMBODIMENT

A joint 10 serves to join one end of a fuel tube 12, shown as metal but alternately a fuel-compatible plastic, to an end of a plastic fuel rail 14. Fuel rail 14 comprises a number of fuel injectors 15 at various locations along its length so that when assembled to an internal combustion engine, fuel is injected into the combustion chambers for entrainment with air and ensuing ignition. Tube 12 may be a supply tube, a return tube, or a crossover tube depending upon application.

Figure 1:
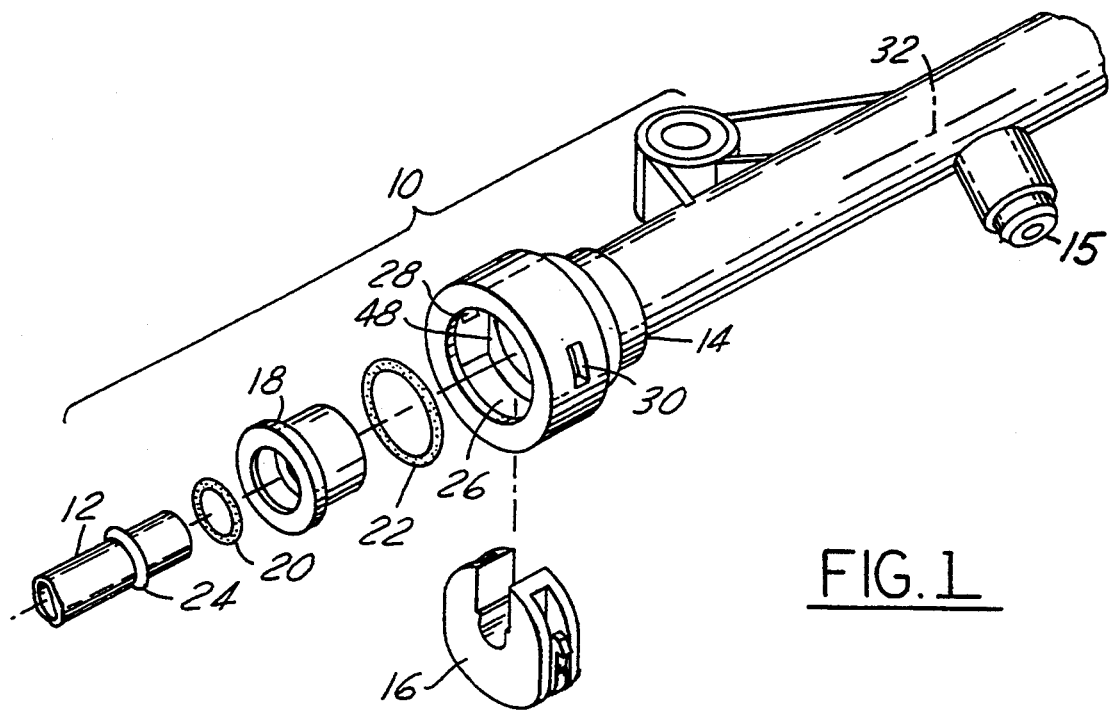
FIG. 1 is an exploded perspective view of a representative joint embodying principles of the invention.
Figure 2:
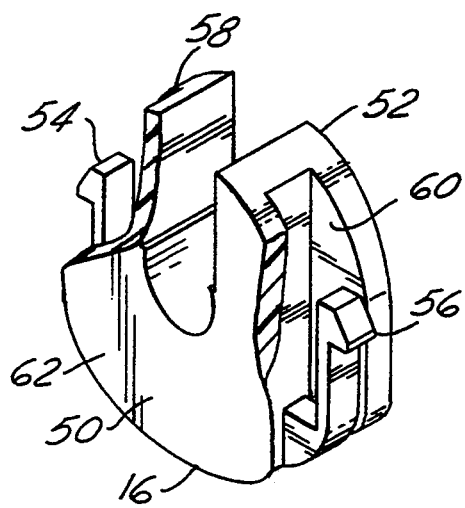
FIG. 2 is a perspective view of one component of the joint, to wit the clip, shown by itself on an enlarged scale from the view of FIG. 1, and with a portion of the clip having been broken away for illustrative purposes.
Figure 3:
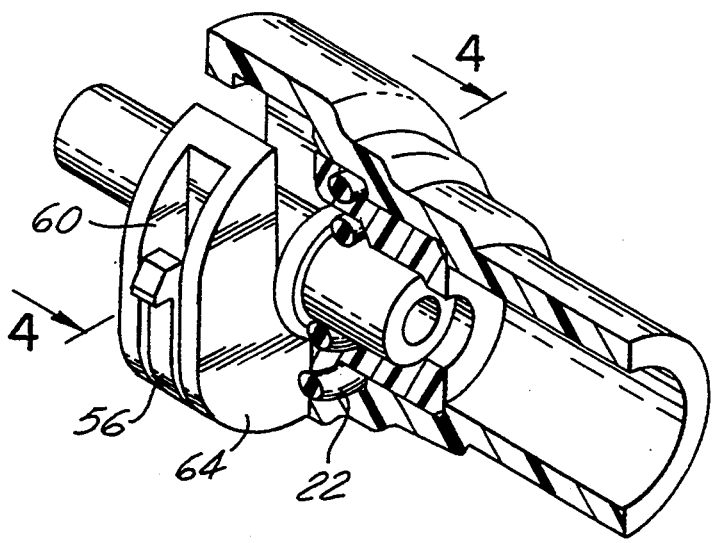
FIG. 3 is an assembled view of the joint from a different perspective from the view of FIG. 1, but on an enlarged scale and with portions broken away for illustrative purposes.

The end of tube 12 shown in FIG. 1 is inserted into the hole in the confronting enlarged end of fuel rail 14 and retained therein by an attaching clip 16. A tubular adapter plug 18 adapts the fit of the inserted end of tube 12 to the enlarged receiving end of fuel rail 14. O-ring seals 20 and 22 are also used. The inserted end of tube 12 also comprises a circumferentially extending, radially outwardly directed flange 24 that is spaced somewhat proximally of its distal terminus.

The enlarged receiving end of fuel rail 14 is provided with certain features for acceptance of clip 16, and these features are a slot 26, and two notches 28 and 30. These two notches may also be considered as slots, because like slot 26, they extend radially completely through the tubular wall of the enlarged receiving end of fuel rail 14, although they are noticeably smaller than slot 26.

Figure 4:
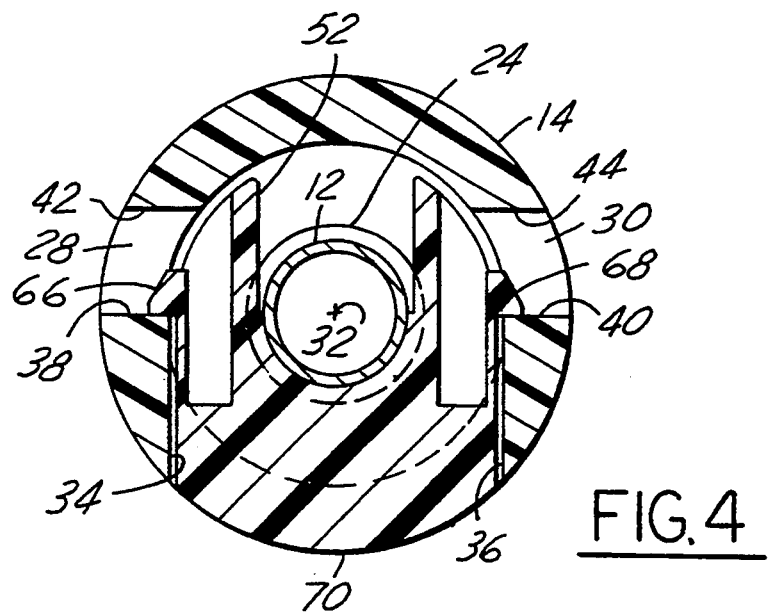
FIG. 4 is a transverse cross sectional view through the joint, taken in the direction of arrows 4—4 in FIG. 3.

As can perhaps be best seen in FIG. 4, slot 26 has a significant circumferential extent about the joint's co-axis 32 shared by the inserted and receiving ends of parts 12 and 14, but nonetheless the slot's circumferential extent is less than one-half of the circumference of the receiving end of fuel rail 14. The slot's two axially extending sides 34 and 36 are parallel, and as viewed in FIG. 4, they extend from the outside of the tubular wall to notches 28 and 30 respectively, where they adjoin respective sides 38 and 40 of the notches at right angles. These sides 38 and 40 in turn extend back to the outside of the tubular wall. Each notch has an opposite side 42 and 44 parallel to the corresponding side 38 and 40. Slot 26 also has two circumferentially extending, parallel sides 46 and 48.

Figure 5:
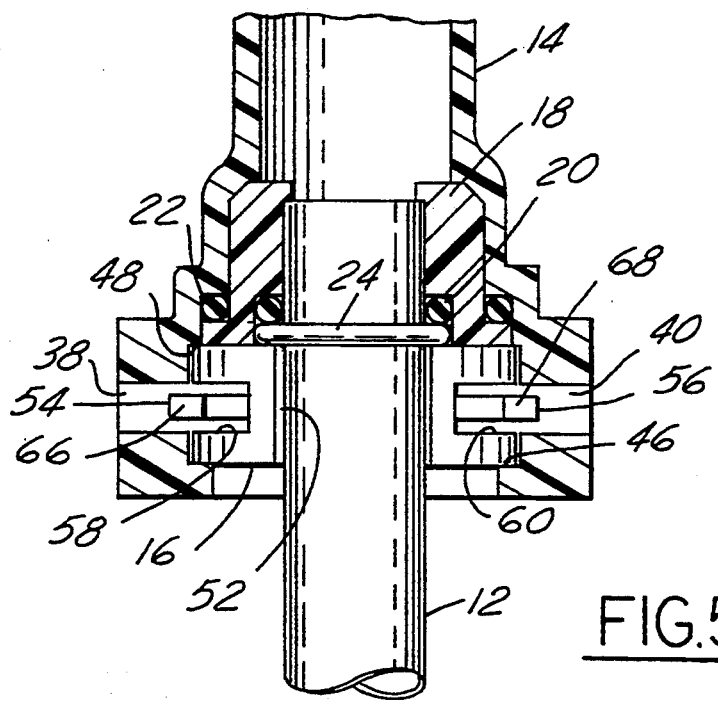
FIG. 5 is a cross sectional view generally in the direction of arrows 5—5 in FIG. 4.

The enlarged receiving end of the fuel rail has several shoulders shaped to receive adapter plug 18, as perhaps best seen in FIG. 5. O-rings seals 20 and 22 are located as shown, with the latter sealing tube 12 to the I.D. of the adapter plug and the former sealing the O.D. of the adapter plug to the I.D. of the fuel rail hole.

Attention is now directed to details of clip 16. The clip has a body comprising a base 50 that is shaped to fit conformedly to slot 26. A fork 52 for fitting over tube 12 projects away from base 50, and a pair of catches 54 and 56 are cantilever-mounted on base 50 on each side of fork 52. These sides, or prongs, radially outwardly of fork 52 comprise open thru-walled channels 58 and 60 that extend lengthwise from base 50 beyond the respective catches. Base 50 and fork 52 cooperatively form axial ends 62 and 64 of the clip that are flat and parallel. As viewed axially the radially outside surface of a respective prong is straight immediately proximal base 50 and beyond that it curves convexly substantially about axis 32.

The joint is made by inserting the end of tube 12, along with the parts 20, 18, and 22, into the hole in the enlarged receiving end of fuel rail 14 so that the flow path through the two parts 12 and 14 is sealed. Such a condition is represented by FIG. 5 although it is to be appreciated that that FIG. 5 shows clip 16 installed. Assembly of clip 16 is performed by inserting it into slot 26 from the position represented by FIG. 1 showing the clip aligned with the slot. Note that the clip has bilateral symmetry so that either axial end can face in either direction. As the clip is being inserted into the slot, inclinded surfaces 66 and 68 at the free ends of catches 54 and 56 engage the sides of the slot, resulting in camming that causes the catches to be flexed more toward the respective channels 58 and 60. The sides 34,36 of slot 26 guide the continued insertion of the clip, as fork 52 fits over tube 12, coming into an overlapping relationship with flange 24, When the clip has been fully inserted, the hooked ends of the catches clear sides 34,36 of the slot, and the catches relax to lodge their hooked ends into notches 28 and 30. This fully inserted position is depicted by FIGS. 4 and 5, and represents the completed joint. Base 50 comprises a surface 70 that is convexly curved substantially about axis 32 to match the circumferential curvature of the fuel rail in the vicinity of slot 26, and hence a neat finished appearance results.

Should it be necessary to disconnect the joint, the fact that notches 28 and 30 are open to the O.D. of the fuel rail allows tool access for pushing the catches clear of the notches to permit removal of the clip.

Clip 16 can be fabricated by conventional plastic molding techniques from a fuel compatable plastic.

While a presently preferred embodiment of the invention has been illustrated and described, it should be appreciated that principles are applicable to other embodiments that fall within the scope of the following claims.

What is claimed is:

1. A clip for use in a joint to join one fluid-carrying tubular conduit coaxially to another tubular conduit, said clip having an axis that is coincident with the co-axis of the conduits when in such a joint and comprising:

a base;

two prongs that are spaced apart from each other so as to lie on opposite sides of said axis and that extend lengthwise from said base so that the base and prongs form a fork having a throat that is open opposite said base, said clip axis passing through said throat;

each prong having a radially inner surface that is toward the throat and a radially outer surface that is opposite the respective radially inner surface;

a respective walled channel that is formed in said radially outer surface of each respective prong so as to be radially outwardly open and that extends from said base lengthwise of the respective prong;

a respective catch that extends lengthwise within a respective walled channel;

each catch comprising a proximal end via which the catch is cantilever-mounted on said base and a free distal end;

each walled channel having a length that extends from said base beyond the free distal end of the respective catch; and each channel having a depth sufficient to allow the free distal end of the respective catch to move increasingly deeper within the respective channel when the catch is flexed about its proximal end toward said axis.

2. A clip as set forth in claim 1 in which a region of the radially outer surface of one of said prongs that is immediately proximal said base is straight, as viewed axially of the clip, and a region of the radially outer surface of said one prong that is distal to said immediately proximal region curves convexly substantially about said axis, as viewed axially of the clip.

3. A clip as set forth in claim 2 in which the respective channel of said one prong ends at said curved region.

4. A clip as set forth in claim 1 in which each walled channel comprises parallel side walls extending radially inwardly from said radially outer surface of the respective prong to form sides of the respective channel and a bottom wall that extends between said side walls to form a bottom of the respective walled channel.

5. A clip as set forth in claim 1 in which a region of the radially outer surface of each of said prongs that is immediately proximal said base is straight, as viewed axially of the clip, and a region of the radially outer surface of each of said prongs that is distal to the respective immediately proximal region curves convexly substantially about said axis, as viewed axially of the clip, and said base comprises a radially outer surface that, as viewed axially of the clip, extends between said straight regions.

6. A clip as set forth in claim 5 in which said radially outer surface of said base curves convexly substantially about said axis.

7. A clip as set forth in claim 5 in which said clip has parallel axial end faces forming opposite axial ends of the clip, each axial end face comprising respective surface portions of said prongs and said base.

8. A clip as set forth in claim 1 in which said clip has parallel axial end faces forming opposite axial ends of the clip, each axial end face comprising respective surface portions of said prongs and said base.

9. A clip as set forth in claim 1 in which said free distal end of a respective catch comprises a surface that is disposed outside the respective walled channel when the catch is not being flexed, but that is adapted to engage said one conduit and cause the catch to thereby be flexed toward said axis during installation of the clip to join said one and said another conduits.

10. A clip for use in a joint to join one fluid-carrying tubular conduit coaxially to another tubular conduit, said clip having an axis that is coincident with the co-axis of the conduits when in such a joint and comprising:

a body comprising a base and two prongs, said two prongs being spaced apart from each other so as to lie on opposite sides of said axis and extending lengthwise from said base so that the base and prongs form a fork having a throat that is open opposite said base, said clip axis passing through said throat;

said body comprising parallel axial end walls forming opposite axial ends of the clip;

respective portions of said prongs and said base being formed by said axial end walls;

those portions of a respective prong formed by said axial end walls being axially spaced apart to provide the prong with a space between said axial end walls;

a respective catch mounted on said body and disposed in said space of the respective prong;

a respective catch comprising a proximal end via which the catch is cantilever-mounted on said body and a free distal end;

the free distal end of the respective catch moving within the respective space of the respective prong when the catch is flexed about its proximal end.

11. A clip as set forth in claim 10 in which each of said prongs has a radially outer surface, each radially outer surface comprises a region immediately proximal said base that is straight, as viewed axially of the clip, and a region distal to said immediately proximal region that curves convexly substantially about said axis, as viewed axially of the clip.

12. A clip as set forth in claim 10 in which each prong comprises a radially inner wall extending lengthwise from said base and widthwise between those portions of the respective prong formed by said axial end walls so as to form a radially inner boundary for the respective space.

13. A clip as set forth in claim 12 in which the proximal end of each catch is mounted on said base.

14. A clip as set forth in claim 13 in which a region of the radially outer surface of each of said prongs that is immediately proximal said base is straight, as viewed axially of the clip, and a region of the radially outer surface of each of said prongs that is distal to the respective immediately proximal region curves convexly substantially about said axis, as viewed axially of the clip, and said base comprises a radially outer surface that, as viewed axially of the clip, extends between said straight regions and curves convexly substantially about said axis.

15. A clip as set forth in claim 10 in which said free distal end of a respective catch comprises a surface that is disposed outside the respective space when the catch is not being flexed, but that is adapted to engage said one conduit and cause the catch to thereby be flexed toward said axis during installation of the clip to join said one and said another conduits.

16. A joint for joining one fluid-carrying tubular conduit to another tubular conduit wherein an end of said one conduit is coaxially inserted into an end of said another conduit and retained by means of a clip separably associated with said conduits, and said one conduit comprises radially outwardly directed flange means on its exterior, characterized in that:
 said another conduit end comprises a slot a) that is disposed less interiorly of said another conduit end than said flange means as viewed along the length of said another conduit end, b) that passes radially through a wall of said another conduit end between inside and outside surfaces of said wall, and c) that has a circumferential extent about the axis of said another conduit end less than one half of the circumferential extent of said another conduit,
 said another conduit end comprises a first notch spaced circumferentially to one side of said slot on the inside surface of said wall and a second notch spaced circumferentially to the opposite side of said slot on the inside surface of said wall,
 said clip is radially insertable into and removable from said slot via the outside of said wall so that when inserted, the clip axially overlaps said flange means to prevent said one conduit from being withdrawn from said another conduit,
 said clip having an axis that is coincident with the co-axis of the conduits and comprising:
 a base;
 two prongs that are spaced apart from each other so as to lie on opposite sides of said one conduit and that extend lengthwise from said base so that the base and prongs form a fork having a throat that is open opposite said base;
 each prong having a radially inner surface that is toward said one conduit and a radially outer surface that is opposite the respective radially inner surface;
 a respective walled channel that is formed in said radially outer surface of each respective prong so as to be radially outwardly open and that extends from said base lengthwise of the respective prong;
 a respective catch that extends lengthwise within a respective walled channel;
 each catch comprising a proximal end via which the catch is cantilever-mounted on said base and a free distal end;
 each walled channel having a length that extends from said base beyond the free distal end of the respective catch;
 each channel having a depth sufficient to allow the free distal end of the respective catch to move increasingly deeper within the respective channel when the catch is flexed about its proximal end toward said axis; and
 said free distal ends of said catches having respective notch-engaging means engaging the respective notches.

17. A joint as set forth in claim 16 in which a region of the radially outer surface of one of said prongs that is immediately proximal said base is straight, as viewed axially of the clip, and a region of the radially outer surface of said one prong that is distal to said immediately proximal region curves convexly substantially about said axis, as viewed axially of the clip.

18. A joint as set forth in claim 17 in which the respective channel of said one prong ends at said curved region.

19. A joint as set forth in claim 16 in which each walled channel comprises parallel side walls extending radially inwardly from said radially outer surface of the respective prong to form sides of the respective channel and a bottom wall that extends between said side walls to form a bottom of the respective walled channel.

20. A joint as set forth in claim 16 in which a region of the radially outer surface of each of said prongs that is immediately proximal said base is straight, as viewed axially of the clip, and a region of the radially outer surface of each of said prongs that is distal to the respective immediately proximal region curves convexly substantially about said axis, as viewed axially of the clip, and said base comprises a radially outer surface that, as viewed axially of the clip, extends between said straight regions.

21. A joint as set forth in claim 20 in which said radially outer surface of said base curves convexly substantially about said axis.

22. A joint as set forth in claim 20 in which said clip has parallel axial end faces forming opposite axial ends of the clip, each axial end face comprising respective surface portions of said prongs and said base.

23. A joint as set forth in claim 16 in which said clip has parallel axial end faces forming opposite axial ends of the clip, each axial end face comprising respective surface portions of said prongs and said base.

24. A joint as set forth in claim 16 in which each notch-engaging portion is disposed outside the respective walled channel when engaging the respective notch.

25. A joint for joining one fluid-carrying tubular conduit to another tubular conduit wherein an end of said one conduit is coaxially inserted into an end of said another conduit and retained by means of a clip separably associated with said conduits, and said one conduit comprises radially outwardly directed flange means on its exterior, characterized in that:
 said another conduit end comprises a slot a) that is disposed less interiorly of said another conduit end than said flange means as viewed along the length of said another conduit end, b) that passes radially through a wall of said another conduit end between inside and outside surfaces of said wall, and c) that has a circumferential extent about the axis of said another conduit end less than one half of the circumferential extent of said another conduit, said another conduit end comprises a first notch spaced circumferentially to one side of said slot on the inside surface of said wall and a second notch spaced circumferentially to the opposite side of said slot on the inside surface of said wall, said clip is radially insertable into and removable from said slot via the outside of said wall so that when inserted, the clip axially overlaps said flange means to prevent said one conduit from being withdrawn from said another conduit, said clip having an axis that is coincident with the co-axis of the conduits and comprising:

a body comprising a base and two prongs, said two prongs being spaced apart from each other so as to lie on opposite sides of said one conduit and extending lengthwise from said base so that the base and prongs form a fork having a throat that is open opposite said base;

said body comprising parallel axial end walls forming opposite axial ends of the clip;

respective portions of said prongs and said base being formed by said axial end walls;

those portions of a respective prong formed by said axial end walls being axially spaced apart to provide the prong with a space between said axial end walls;

a respective catch mounted on said body and disposed in said space of the respective prong;

a respective catch comprising a proximal end via which the catch is cantilever-mounted on said body and a free distal end;

the free distal end of the respective catch moving within the respective space of the respective prong when the catch is flexed about its proximal end; and said free distal ends of said catches having respective notch-engaging means engaging the respective notches.

26. A joint as set forth in claim 25 in which each of said prongs has a radially outer surface, each radially outer surface comprises a region immediately proximal said base that is straight, as viewed axially of the clip, and a region distal to said immediately proximal region that curves convexly substantially about said axis, as viewed axially of the clip.

27. A joint as set forth in claim 25 in which each prong comprises a radially inner wall extending lengthwise from said base and widthwise between those portions of the respective prong formed by said axial end walls so as to form a radially inner boundary for the respective space.

28. A joint as set forth in claim 27 in which the proximal end of each catch is mounted on said base.

29. A joint as set forth in claim 28 in which a region of the radially outer surface of each of said prongs that is immediately proximal said base is straight, as viewed axially of the clip, and a region of the radially outer surface of each of said prongs that is distal to the respective immediately proximal region curves convexly substantially about said axis, as viewed axially of the clip, and said base comprises a radially outer surface that, as viewed axially of the clip, extends between said straight regions and curves convexly substantially about said axis.

30. A joint as set forth in claim 25 in which each notch-engaging portion is disposed outside the respective space when engaging the respective notch.

31. A joint as set forth in claim 30 in which said notch-engaging portions engage respective notches substantially diametrically opposite each other.

32. A joint as set forth in claim 25 in which an adapter is disposed between said conduits to adapt the fit of said one conduit to said another conduit, and said clip is also in axially overlapping relation to said adapter.

33. A joint as set forth in claim 25 in which said notches extend completely through the wall of said another conduit end so as to be radially outwardly open.

34. A joint as set in claim 25 characterized further in that said slot has parallel sides extending to said notches, and said notches are at right angles to said slot's sides.

35. A joint as set forth in claim 25 in which said clip is a unitary plastic part.

* * * * *